United States Patent [19]
Dunlap

[11] 3,902,269
[45] Sept. 2, 1975

[54] FISHING ROD HOLDER

[76] Inventor: Melvin Elmer Dunlap, 620 Mantauk Hwy., West Hampton Beach, N.Y. 11978

[22] Filed: Mar. 6, 1974

[21] Appl. No.: 448,502

[52] U.S. Cl. .................................. 43/21.2; 248/44
[51] Int. Cl.² ........................................ A01K 97/10
[58] Field of Search ................. 43/21.2; 248/43, 44

[56] References Cited
UNITED STATES PATENTS
3,158,866  11/1964  Powers.................................. 248/43
3,783,547  1/1974  Bystrom et al...................... 43/21.2

Primary Examiner—Louis G. Mancene
Assistant Examiner—Peter K. Skiff

[57] ABSTRACT

A fishing rod holder for use on a flat surface such as a boat deck or pier. The holder includes a flat base portion and an upstanding hollow tubular portion which is adapted to receive a fishing rod. The hollow tubular portion and the base portion are interconnected by means of a flexible narrowed joint section integral with the base portion. The joint flexes to allow movement of the rod holder so that the fishing rod can move freely in response to movements of a fish or the fisherman. The joint itself comprises a narrowed section of strong, flexible material such as plastic to permit this free movement.

10 Claims, 3 Drawing Figures

PATENTED SEP 2 1975  3,902,269

FISHING ROD HOLDER

BACKGROUND OF THE INVENTION

In sport fishing there have been many devices for holding fishing rods. Some of these have been merely holes drilled into the deck or floor of a boat, others were extremely complex mechanical devices, with many parts. Some of these devices were connected to heavy chairs which were permanently secured to the floor by bolts, thus making the devices immovable and permanently marking the floor surface.

The present device overcomes these difficulties by requiring no fastening and being completely portable. The unit is small and compact and may be used in conjunction with a chain from a sitting position, or on any surface from a standing position.

SUMMARY OF THE INVENTION

The present invention resides in a fishing rod holder which permits movement of the fishing rod in response to the movements of a fish or the fisherman. This movement of the rod is made possible by a flexible joint positioned between the base and the tubular rod holder. The joint is a tapered plastic section which is smaller in diameter than the holder and is integral with the base. The joint is constructed so that it is strong enough to support the rod and holder but still flexible enough to move in response to movement of a fish or movement of the rod by the fisherman. The flexibility is designed so that the weight and length of the tubular member and the fishing rod will cause the proper lever arm effect and will cause the desired degree of flexibility of the joint.

The object of this invention is to provide a holder for a fishing rod which is able to swivel in all directions to aid a fisherman.

A further object of this invention is to provide a fishing rod holder which has a simple construction and no complex mechanical configurations.

A further object of this invention is to provide a completely portable, easily assemblable holder for a fishing rod, which requires no fastening to any surface.

A further object is such a holder being constructed of plastic and having a single piece plastic joint.

PREFERRED EMBODIMENT OF THE INVENTION

The fishing rod holder of this invention includes a base portion 1 which is preferably die cast of polypropylene and is rectangular in shape, for example, 5 × 10 inches and one-fourth inch thick. Its upper 2 and lower 3 surfaces have scored grooves in a cross-hatched pattern which form diamond shaped raised squares of approximately one-half inch on a side. The pattern creates a rough high frictional surface to assist the fisherman in holding the base and thus the fishing rod holder firmly to a surface.

Figure 2:
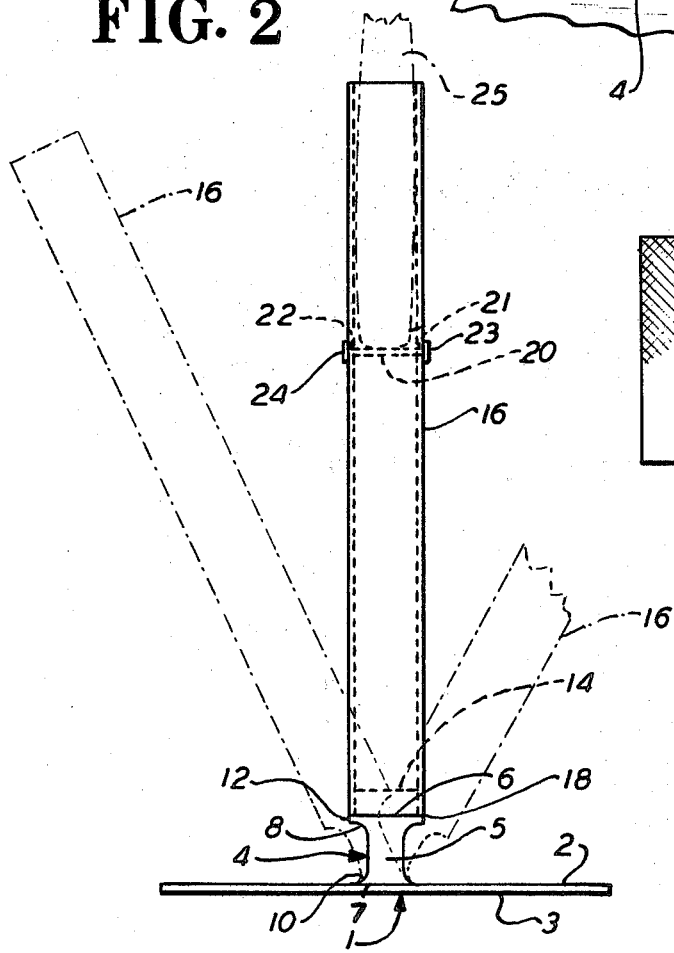
FIG. 2 is a view of the fishing rod holder of this invention with dotted lines illustrating its movement.
Figure 3:
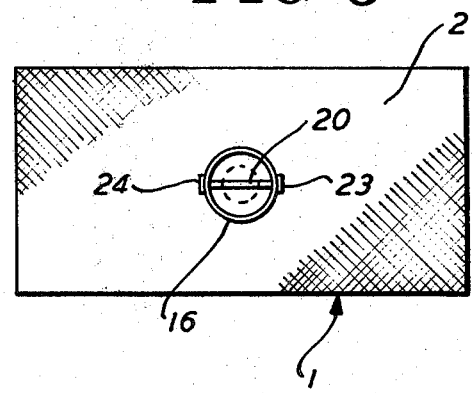
FIG. 3 is a plan view of the invention.

Projecting from the center of the top surface of the base is a short narrowed column 4 which has a narrowed central section 5, and flares out in diameter to increased diameter surfaces at 6 and 7. The diameter increases gradually as shown in FIG. 2 toward the surfaces 6 and 7. This increase is along curves 8 and 10 which are of the same or substantially the same radius so that the bending properties of the column are uniform. The curves 10 terminate at the lower surface while the curves 8 terminate below the upper surface 6 so that a small section 12 of uniform diameter is formed next to the upper surface. This provides a stronger surface on which to attach the tubular section of the rod holder as will be discussed in more detail hereinafter.

The diameter of the central section of the joint is about one-half the diameter of its surfaces 6 and 7 to provide the proper relationship between strength and flexibility. The diameter of the central section is for example 0.9 inch while surfaces 6 and 7 are about 1.9 inches in diameter. This relationship between diameters is such that the central section of the joint will be flexible to a limited extent under a load, but will also be strong enough to support the rod under the pull of a fish and also be resilient enough to return to its original position. If the diameter were to small, depending on the material used, the joint might either break under the load of a fish or exceed its modulus of elasticity and thus be permanently deformed. On the other hand, if it were not narrow enough it would not have sufficient flexibility to bend under the pull of a fish and thus might break or cause the fishing rod to break. Thus, the relative diameter of the center section of the joint in relation to its upper and lower surfaces and to the material used is of the utmost significance. For the polypropylene material disclosed, the 1.9 to 0.9 ratio of central diameter to upper and lower diameter appears to provide the desired degree of flexibility and strength. The dotted lines in FIG. 2 illustrate the flexibility of the joint.

It is also important that the diameter increase and decrease in a gradual manner, as previously mentioned, from the central section to the larger surfaces 6 and 7. This is to insure that there will be no sharp changes in diameter which would cause points of stress concentration.

Projecting from the top of the joint is an extension 14 which is slightly smaller in diameter than the internal diameter of the tubular member. This is so that the tubular member can fit over this extension to connect them together. This will be discussed in detail hereinafter.

Now discussing the tubular member which holds the fishing rod; this member 16 is a hollow cylindrical member of uniform diameter, for example with the base as previously described, the member would be a 19.5 inches length of 1½ inch diameter pipe having an outside diameter of 1.90 inch and an inside diameter of 1.61 inches. It would be of a plastic material such as Schedule 40 polyvinyl. This pipe is placed over the extension 14 which is of a slightly smaller diameter, e.g. 1.58 inches, with a pipe inside diameter of 1.61 inches. This difference in diameters provides the space necessary to apply glue or other adhesive to affix the tubular member to the joint. When the pipe is placed over extension 14, its end 18 rests on the surface 6 of the joint. When adhesive is applied it is applied both between the inner surface of the tubular member and the surface of extension 14 and also between the bottom edge 18 of the tubular member and the upper surface 6 of the joint. The length of this tubular section is very important. It must be long enough that it provides the correct amount of force when combined with the force of a fishing rod and the pull of a fish to cause the central section of the joint to flex with the pull of a fish. If this rod were not sufficiently long such as the 19.5 inches when compared to the 1.5 inch length of the joint (about 10 to 1) and the joint's central section diameter of 0.9 inch, the pull of a fish might not cause the proper flexing of the joint and thus might cause the joint to break; or in the alternative, for the fishing line to break — neither of which are acceptable alternatives. If the tubular member were too long and thus had too great a weight it might cause the joint to flex with either no fish on the line, or an insufficient pull of a fish. These are also unacceptable.

Thus, the tubular member must apply a certain force to the joint when compared with the dimensions of the joint to insure proper operation.

With the materials, as previously designated, the 19.5 inch length would be the proper length. It is also noted that the longer dimension of the base is about one-half the length of the tubular member so that the base can properly balance the lever arm force caused by the tubular member when it has a fishing rod in place.

To control the depth of insertion of the fishing rod into the tubular member a rivet or other member 20 is inserted through the center of the tubular member. Holes 21 and 22 are drilled or otherwise formed in the tubular member along its centerline and the rivet inserted therein. The rivet can be placed anywhere along the length of the tubular member. However, preferably it is placed closer to the top as shown in FIG. 2. The ends 23 and 24 of the rivet are flattened to hold it permanently in position. The rivet limits the depth to which the fishing rod is inserted into the tubular member. Dotted lines 25 in FIG. 2 show the bottom end of the fishing rod 26 resting against rivet 20. This depth of insertion is quite important since it determines the length of the lever arm force (that is the force applied through the tubular member and fishing rod) applied to the joint. If this lever arm force is either too short or too long, the joint might not flex properly. Therefore the positioning of this rivet is quite important.

Figure 1:
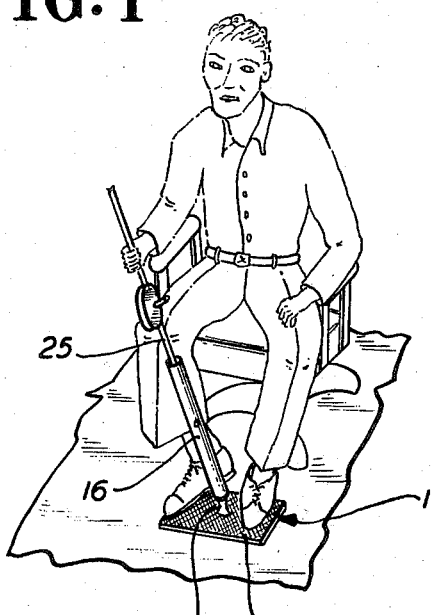
FIG. 1 illustrates a person using the fishing rod holder of this invention.

In operation, the base is placed on a flat surface, such as the deck of a boat or a pier, and the user places his feet on the top surface, as shown in FIG. 1. This securely holds the base against movement because of the friction between the user's feet and the base and the boat deck (or flat surface) and the base, due to the cross hatching on the top and bottom surfaces of the base. Because of this frictional hold, only a small amount of force is required to hold the base in position. The base can then be easily held in position from either the sitting or standing positions. FIG. 1 shows the user in the sitting position, however, it will be appreciated that the invention will operate equally as well from the standing position. After the feet are placed on the base, the fishing rod is placed in the tubular member. It can then be moved because of the flexibility of the joint. This flexibility permits the fisherman to greatly increase the fishing rod's maneuverability when jigging, i.e., bobbing the rod to lure fish, and when fighting the fish once it is hooked.

It will thus be appreciated that an efficient fishing rod holder has been disclosed which is easily transported and requires no permanent connection.

While specific embodiments of the invention have been described, it will be appreciated that the invention is not limited thereto as many modifications may be made by one skilled in the art which falls within the true spirit and scope of the invention.

I claim:

1. A fishing rod holder comprising:
   a flat base portion having a pattern formed thereon to increase its frictional resistance
   a flexible joint constructed of a section of plastic which has a reduced flexible middle and larger upper and lower surfaces and
   a tubular rod holding member immovably connected to the upper surface of the flexible joint.

2. The fishing rod holder of claim 1 wherein the flexible joint comprises a cylindrical column having a uniform diameter central section which gradually increases in diameter to a lower section and an upper section both of which are substantially twice the diameter of the central section.

3. The fishing rod holder of claim 2 wherein the base and the joint are integral.

4. The fishing rod holder of claim 3 wherein the tubular member has an outer diameter which is substantially the same diameter as the upper surface of the joint and is constructed of polyvinyl.

5. The fishing rod holder of claim 3 wherein the base is rectangular the long dimension is approximately one-half the length of the tubular member.

6. The fishing rod holder of claim 3 wherein the central diameter of the joint is approximately one-tenth as long as the tubular member.

7. The fishing rod holder of claim 3 wherein the patterns formed on the base consist of a cross-hatched grooves to create a raised diamond shaped pattern on its upper and lower surfaces.

8. The fishing rod holder of claim 3 including a pin which is positioned through the center line of the tubular member to control the depth of insertion of a fishing rod into the member.

9. The fishing rod holder of claim 3 wherein the joint includes an extension which fits into the tubular member to connect the two together.

10. The fishing rod holder of claim 2 wherein the plastic material is polypropylene.

* * * * *